(12) United States Patent
Gale et al.

(10) Patent No.: US 10,300,450 B2
(45) Date of Patent: May 28, 2019

(54) METHOD AND DEVICE FOR DEPOSITING A SUBSTANCE ON A SUBMERGED SURFACE

(71) Applicant: Wasatch Microfluidics, LLC, Salt Lake City, UT (US)

(72) Inventors: Bruce K. Gale, Salt Lake City, UT (US); Joshua W. Eckman, Salt Lake City, UT (US); Adam Miles, Salt Lake City, UT (US); Christopher Morrow, Salt Lake City, UT (US); James Smith, Bountiful, UT (US); Sriram Natarajan, Bridgewater, NJ (US); Mark Eddings, Salt Lake City, UT (US)

(73) Assignee: Carterra, Inc., Salt Lake City, UT (US)

( * ) Notice: Subject to any disclaimer, the term of this patent is extended or adjusted under 35 U.S.C. 154(b) by 816 days.

(21) Appl. No.: 14/026,705

(22) Filed: Sep. 13, 2013

(65) Prior Publication Data

US 2014/0171342 A1    Jun. 19, 2014

Related U.S. Application Data

(60) Provisional application No. 61/701,558, filed on Sep. 14, 2012.

(51) Int. Cl.
*B01J 19/00* (2006.01)
*B01L 3/02* (2006.01)

(52) U.S. Cl.
CPC ......... *B01J 19/0046* (2013.01); *B01L 3/0289* (2013.01); *B01J 2219/0074* (2013.01);
(Continued)

(58) Field of Classification Search
CPC ...................................................... B01J 19/00
(Continued)

(56) References Cited

U.S. PATENT DOCUMENTS

| 3,974,508 A | 8/1976 | Blumenthal |
| 5,641,640 A | 6/1997 | Hanning |

(Continued)

FOREIGN PATENT DOCUMENTS

| JP | 11281534 | 10/1999 |
| JP | 2004/101480 | 4/2004 |

(Continued)

OTHER PUBLICATIONS

Chang-Yen et al., A Novel PDMS Microfluidic Spotter for Fabrication of Protein Chips and Microarrays, Oct. 2006, Journal of Microeletromechanical Systems, vol. 15, No. 5, pp. 1145-1151.*

(Continued)

*Primary Examiner* — Dah-Wei D. Yuan
*Assistant Examiner* — Andrew J Bowman
(74) *Attorney, Agent, or Firm* — Thorpe North & Western, LLP

(57) ABSTRACT

The present disclosure provides apparatuses, systems, and methods involving a spotter for depositing a substance on a submerged surface. The spotter comprises an outlet cavity defined at least in part by a spotting orifice, a first opening, and a second opening. The spotter also comprises a first conduit fluidly coupled to the first opening and a second conduit fluidly coupled to the second opening. The spotter is adapted so that fluid flowing through the first conduit and the second conduit is communicated among the first opening, the second opening, and a submerged deposition surface when the sealing orifice is sealed against the submerged deposition surface to form a deposition spot on the submerged deposition surface. The submerged deposition surface is within a liquid such that the liquid covers the deposition spot upon removal of the orifice from the deposition surface.

17 Claims, 4 Drawing Sheets

(52) U.S. Cl.
CPC ............ *B01J 2219/00385* (2013.01); *B01J 2219/00387* (2013.01); *B01J 2219/00418* (2013.01); *B01J 2219/00527* (2013.01); *B01J 2219/00659* (2013.01); *B01J 2219/00722* (2013.01); *B01J 2219/00734* (2013.01); *B01J 2219/00743* (2013.01); *B01L 2200/0673* (2013.01); *B01L 2300/0829* (2013.01); *B01L 2400/022* (2013.01); *B01L 2400/0487* (2013.01)

(58) Field of Classification Search
USPC .......................................................... 506/32
See application file for complete search history.

(56) References Cited

U.S. PATENT DOCUMENTS

| | | | |
|---|---|---|---|
| 5,847,356 | A | 12/1998 | Santhanam |
| 5,965,456 | A | 10/1999 | Malmqvist et al. |
| 6,008,893 | A | 12/1999 | Roos et al. |
| 6,090,251 | A | 7/2000 | Sundberg et al. |
| 6,110,426 | A | 8/2000 | Shalon et al. |
| 6,207,381 | B1 | 3/2001 | Larsson et al. |
| 6,274,091 | B1 | 8/2001 | Mohan et al. |
| 6,309,891 | B1 | 10/2001 | Shalon et al. |
| 6,365,349 | B1 | 4/2002 | Moynihan et al. |
| 6,391,625 | B1 | 5/2002 | Park et al. |
| 6,461,812 | B2 | 10/2002 | Barth et al. |
| 6,485,690 | B1 | 11/2002 | Pfost et al. |
| 6,493,097 | B1 | 12/2002 | Ivarsson |
| 6,503,715 | B1 | 1/2003 | Gold et al. |
| 6,511,850 | B1 | 1/2003 | Vigh et al. |
| 6,589,798 | B1 | 7/2003 | Lofas |
| 6,594,432 | B2 | 7/2003 | Chen et al. |
| 6,596,237 | B1 | 7/2003 | Borrelli et al. |
| 6,623,696 | B1 | 9/2003 | Kim et al. |
| 6,656,740 | B1 | 12/2003 | Caren et al. |
| 6,699,719 | B2 | 3/2004 | Yamazaki et al. |
| 6,703,203 | B2 | 3/2004 | Shao et al. |
| 6,714,303 | B2 | 3/2004 | Ivarsson |
| 6,733,968 | B2 | 5/2004 | Yamamoto et al. |
| 6,762,061 | B1 | 7/2004 | Borrelli et al. |
| 6,833,112 | B2 | 12/2004 | Hoummady |
| 6,835,352 | B2 | 12/2004 | Ito et al. |
| 6,872,359 | B2 | 3/2005 | Caren et al. |
| 6,884,626 | B1 | 4/2005 | Borrelli et al. |
| 6,994,429 | B1 | 2/2006 | McEntee et al. |
| 6,999,175 | B2 | 2/2006 | Ivarsson |
| 7,015,043 | B2 | 3/2006 | Roos et al. |
| 7,025,935 | B2 | 4/2006 | Jones et al. |
| 7,081,958 | B2 | 7/2006 | Ivarsson |
| 7,219,528 | B2 | 5/2007 | Tidare et al. |
| 7,262,866 | B2 | 8/2007 | Ivarsson |
| 7,320,879 | B2 | 1/2008 | Karlsson et al. |
| 7,373,255 | B2 | 5/2008 | Karlsson et al. |
| 7,402,286 | B2 | 7/2008 | Pinkel et al. |
| 8,210,119 | B2 | 7/2012 | Gale et al. |
| 8,211,382 | B2 | 7/2012 | Myszka et al. |
| 8,383,059 | B2 | 2/2013 | Chang-Yen et al. |
| 8,999,726 | B2 | 4/2015 | Chang-Yen et al. |
| 2001/0020588 | A1 | 9/2001 | Adourian et al. |
| 2002/0028160 | A1 | 3/2002 | Xiao et al. |
| 2002/0164824 | A1 | 11/2002 | Xiao et al. |
| 2002/0179447 | A1 | 12/2002 | Sundberg et al. |
| 2003/0003027 | A1 | 1/2003 | Albert et al. |
| 2003/0068253 | A1 | 4/2003 | Bass et al. |
| 2003/0099577 | A1 | 5/2003 | Renaud et al. |
| 2003/0124734 | A1 | 7/2003 | Dannoux |
| 2003/0228241 | A1 | 12/2003 | Legge |
| 2004/0014102 | A1 | 1/2004 | Chen et al. |
| 2004/0109793 | A1 | 6/2004 | McNeely et al. |
| 2005/0047962 | A1 | 3/2005 | Laurell et al. |
| 2005/0106621 | A1 | 5/2005 | Winegarden et al. |
| 2005/0249641 | A1 | 11/2005 | Blankenstein et al. |
| 2005/0266582 | A1 | 12/2005 | Modlin et al. |
| 2006/0040398 | A1 | 2/2006 | Schulz et al. |
| 2006/0233673 | A1 | 10/2006 | Beard et al. |
| 2006/0286001 | A1 | 12/2006 | Sundberg et al. |
| 2007/0087348 | A1 | 4/2007 | Notcovich et al. |
| 2007/0199642 | A1 | 8/2007 | Natarajan |
| 2007/0231458 | A1* | 10/2007 | Gale ............... B01J 19/0046 427/2.11 |
| 2007/0231880 | A1 | 10/2007 | Chang-yen et al. |
| 2010/0248994 | A1 | 9/2010 | Gale et al. |
| 2015/0266021 | A1 | 9/2015 | Eckman et al. |
| 2015/0269312 | A1 | 9/2015 | Miles et al. |

FOREIGN PATENT DOCUMENTS

| | | |
|---|---|---|
| JP | 2004/518106 | 6/2004 |
| JP | 2004/538446 | 12/2004 |
| WO | WO 01/074490 | 10/2001 |
| WO | WO 02/075280 | 9/2002 |
| WO | WO 2006/014460 | 2/2006 |

OTHER PUBLICATIONS

Kool et al., Nanofraction Spotter Technology for Rapid Contactless and High-Resolution Deposition of LC Eluent for Further Off-Line Analysis, Jan. 2011, vol. 83, pp. 125-132.*

* cited by examiner

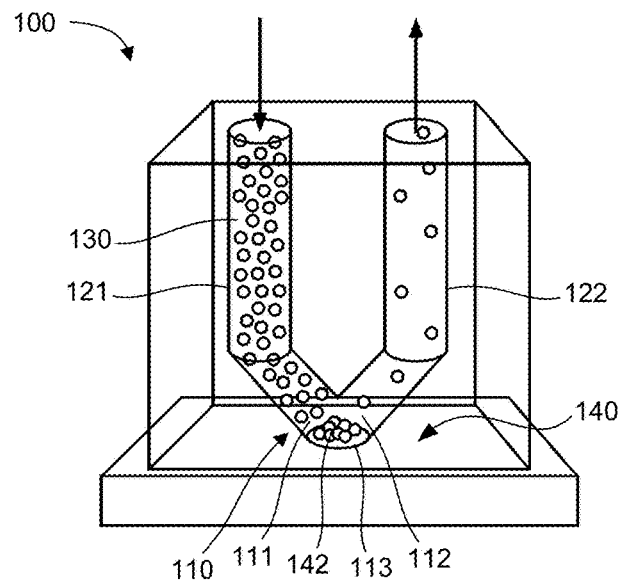
FIG. 1
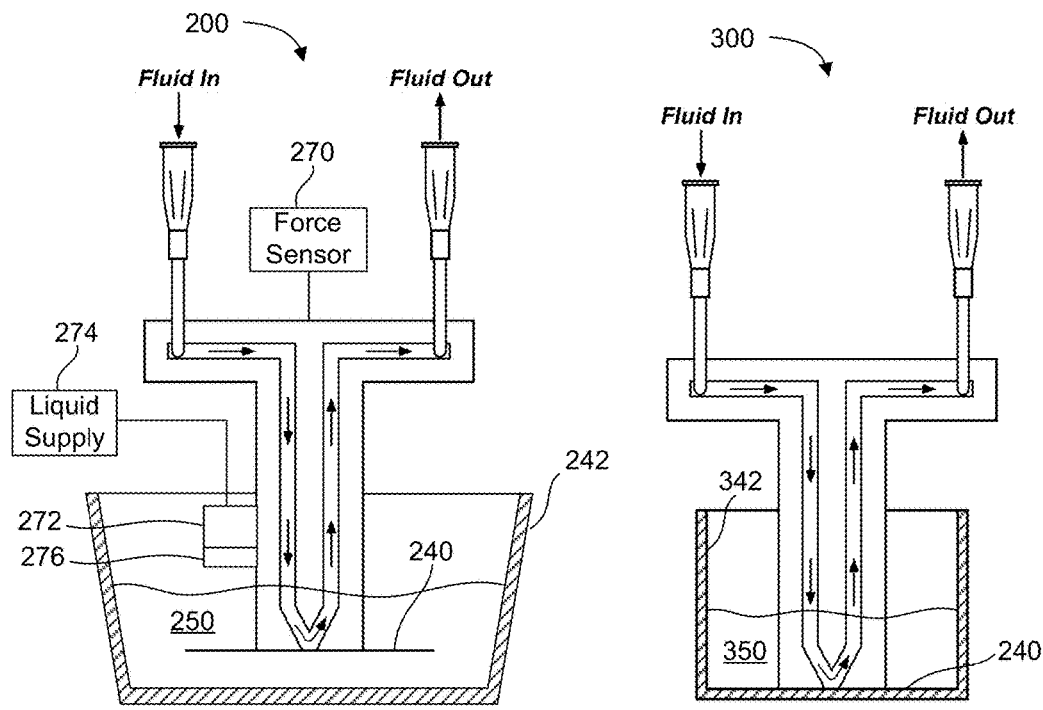
FIG. 2A  FIG. 2B

METHOD AND DEVICE FOR DEPOSITING A SUBSTANCE ON A SUBMERGED SURFACE

BACKGROUND

There are many types of fluids that would benefit from interrogation systems that maintain the integrity of the fluid in the system. For example, to name one, it is understood that there complex interactions between phospholipids and membrane-associated proteins, such as those involved in Anti-Phospholipid Syndrome (APS) and a multitude of other human diseases. Yet most of the tools, methods, and approaches to interrogate these systems lack a similar level of sophistication. Some systems that better mimic in vivo membranes have been described but tend to have limited throughput. Current methods used to create micropatterned lipid arrays include microcontact printing, deep ultraviolet photolithography (UV), the use of prepatterned substrates, and 2D microfluidics. Microcontact printing utilizes a stamp to transfer material onto a substrate. Deep-UV radiation uses a photomask to protect the array regions while the exposed regions are degraded through exposure to UV radiation. Hand or robotic pipetting can be used with prepatterned substrates to corral the material into spatially distinct regions.

Many of these methods employ backfilling with vesicles to create multicomposition arrays, limiting the number of bilayers with distinct compositions. Robotics can generate multicomponent membrane arrays with small spot sizes (250 μm), but due to the small volumes (picoliters), this is typically performed in a humidity chamber (~98% humidity) to prevent evaporation. The use of 2D microfluidics for the creation of lipid arrays involves introducing a solution of vesicles through a single plane of microchannels, producing parallel lanes of patterned lipids. This offers a simple and low-cost alternative, but the 2D flow lanes limit the ability to create high density arrays. An approach that combines both the sophistication of a fluid membrane bilayer and the robustness and throughput of solid-supported arrays is sorely needed for certain types of diagnostics, such as APS diagnostic testing.

More generally, all major human diseases including metabolic autoimmune diseases, vascular diseases, neurological diseases, and cancer have essential pathologic mechanisms involving dysfunctional cell and/or internal membranes. The combination of fluid lipid bilayers and membrane proteins constitute the major structural components of biological cell membranes. It would therefore be desirable to generate arrayed biomembrane bilayers consisting of both lipid and protein supported by a solid surface while maintaining their three-dimensional properties. This would enable analysis of important integral membrane and lipid-associated proteins in a more native-like environment, which is an environment that is needed for proper biological function.

BRIEF DESCRIPTION OF THE DRAWINGS

Additional features and advantages of the disclosure will be apparent from the detailed description which follows, taken in conjunction with the accompanying drawings, which together illustrate, by way of example, features of the disclosure; and, wherein:

FIG. 1 is an illustration of aspects of a spotter in accordance with an embodiment of the present disclosure.

FIG. 2A is an illustration of a spotter in accordance with another embodiment of the present disclosure.

FIG. 2B is an illustration of a spotter in accordance with another embodiment of the present disclosure.

DETAILED DESCRIPTION

Figure 3:
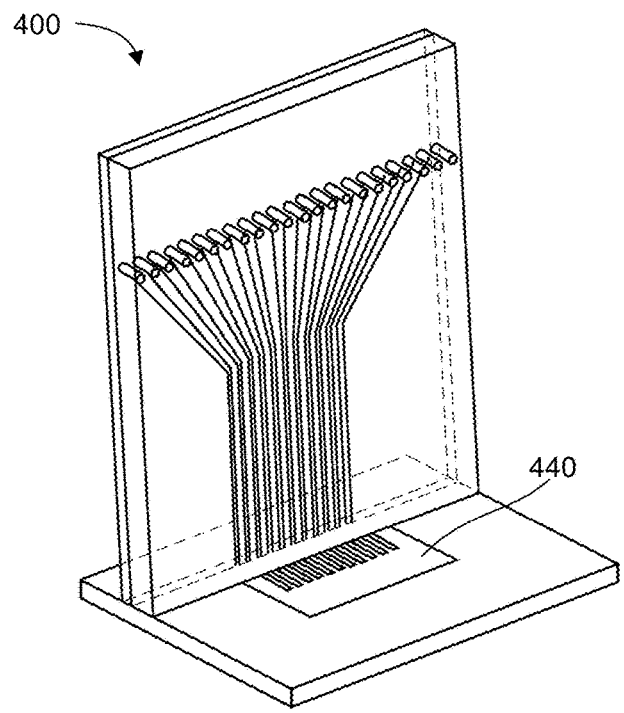
FIG. 3 is an illustration of aspects of a spotter in accordance with another embodiment of the present disclosure.

Before the present invention is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used in this specification and the appended claims, the singular forms "a," "an," and "the" include plural referents unless the context clearly dictates otherwise. Thus, for example, reference to "an orifice" includes one or more of such orifices, and reference to "the deposition surface" includes reference to one or more deposition surfaces.

As used herein, the term "fluid" refers to any material that has the ability to flow, which can also be described as the ability to take the shape of its container, or does not substantially resist deformation. This term includes liquids or gases. Also, a dispersion is considered a fluid herein, even though there are solids dispersed in a liquid. This term also includes non-Newtonian fluids, i.e. fluids with viscosities that change with an applied strain rate, and Newtonian fluids, i.e. fluids with viscosities that are nearly constant regardless of applied forces.

As used herein, the term "substantially" or "substantial" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of action, characteristic, property, state, structure, item, or result. For example, a composition that is "substantially free of" particles would either completely lack particles, or so nearly completely lack particles that the effect would be the same or similar as if it completely lacked particles. In other words, a composition that is "substantially free of" an ingredient or element may still contain such an item as long as there is no significant or measurable effect thereof.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 micron to about 5 microns" should be interpreted to include not only the explicitly recited values of about 1 micron to about 5 microns, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Examples discussed herein set forth a spotter that can deposit a substance on a submerged surface. In particular examples, the spotter can provide submerged printing of arrays of lipids, membrane proteins, and tagged cells with the biomaterial in a liquid environment during and after deposition. Additionally, in some examples, the spotter can enable an automated printing process for biological membranes and/or proteins.

Specifically, a spotter for depositing a substance on a submerged deposition surface can comprise an outlet cavity defined at least in part by a spotting orifice, a first opening, and a second opening. The spotter can also comprise a first conduit fluidly coupled to the first opening. Additionally, the spotter can comprise a second conduit fluidly coupled to the second opening. The spotter can be adapted so that fluid flowing through the first conduit and the second conduit is communicated among the first opening, the second opening, and a submerged deposition surface when the sealing orifice is sealed against the submerged deposition surface to form a deposition spot on the submerged deposition surface. The submerged deposition surface can be within a liquid such that the liquid covers the deposition spot upon removal of the orifice from the deposition surface.

Furthermore, a method for depositing a substance on a submerged deposition surface in accordance with the principles herein can comprise obtaining a spotter, including an outlet cavity defined at least in part by a sealing orifice, a first opening, and a second opening, a first conduit fluidly coupled to the first opening, and a second conduit fluidly coupled to the second opening. The method can also comprise sealing the spotting orifice against a liquid-submerged deposition surface. Additionally, the method can comprise causing fluid to flow through the first conduit and the second conduit, thereby communicating among the first opening, the second opening, and the liquid-submerged deposition surface to form a deposition spot on the liquid-submerged deposition surface.

With these general examples set forth above, it is noted in the present disclosure that when describing the spotter for depositing a substance on a submerged surface described herein, or related methods, each of these descriptions are considered applicable to the other, whether or not they are explicitly discussed in the context of that embodiment. For example, in discussing the spotter per se, the method embodiments are also included in such discussions, and vice versa.

Furthermore, various modifications and combinations can be derived from the present disclosure and illustrations, and as such, the following figures should not be considered limiting. It is noted that reference numerals in various FIGS. will be shown in some cases that are not specifically discussed in that particular figure. Thus, discussion of any specific reference numeral in a given figure is applicable to the same reference numeral of related figures shown herein.

Several aspects of a spotter 100 for depositing a substance on a submerged surface are illustrated in FIG. 1. For example, the spotter can comprise an outlet cavity 110 defined at least in part by an orifice 113, and can have a first opening 111 and a second opening 112. The spotter can also include a first conduit 121 fluidly coupled to the first opening 111, and a second conduit 122 fluidly coupled to the second opening 112. Fluid 130 (which in this examples includes particles carried by a carrier fluid), such as a probe and/or a target compound, can flow through the first conduit and the second conduit and can be communicated among the first opening, the second opening, and a deposition surface 140 when the orifice is sealed against the deposition surface. This can form a deposition spot 142 on the deposition surface.

The spotter 100 can increase the surface density at the deposition spot by directing flow of the fluid 130 over the deposition spot area until a high-density deposition spot has been created. Examples of probes or other purpose materials that may be flowed over the deposition surface include proteins, nucleic acids, including deoxyribonucleic acids (DNA) and ribonucleic acids (RNA), cells, peptides, lectins, modified polysaccharides, synthetic composite macromolecules, functionalized nanostructures, synthetic polymers, modified/blocked nucleotides/nucleosides, synthetic oligonucleotides, modified/blocked amino acids, fluorophores, chromophores, ligands, chelates, haptens, drug compounds, antibodies, sugars, lipids, liposomes, tissue, viruses, any nano or microscale object, and any combination thereof. As the fluid flows over the deposition surface, constituents therein can bind or adsorb to the deposition surface, depending on the chemistry involved in the system.

The conduits 121, 122, such as microchannels and/or microtubules, within the spotter 100 are used to guide the fluid 130 to and from the area of spot deposition on the deposition surface, such that the flow through the conduits can produce a high surface concentration in a specific region. The outlet orifice 113 can be configured to form a seal or connection with the deposition surface when pressed against the deposition surface. In one aspect, the deposition surface can be flat to facilitate sealing with the orifice, e.g., if the orifice is likewise flat or flattened to some degree along the same plane. When sealed, the outlet opening can provide a fluid-tight chamber in which the fluid can flow from the first conduit to the second conduit, and vice versa, such that the fluid contacts the deposition surface, allowing deposition of substances in the fluid on the deposition surface. In one aspect, the fluid may be injected into an inlet of the first conduit, flowed to the deposition spot area via the first conduit to the orifice, and then flowed out through the second conduit. Flow within the spotter may be controlled numerous ways, for example, via pressure flow, electrokinetics, gravity flow, osmotic pressure, or combinations thereof.

In one embodiment, the first and second conduits can be connected to the same fluid reservoir, thereby allowing recycling of the fluid and any solute contained therein. In another embodiment, the first conduit can be connected to a first fluid reservoir and the second conduit can be connected to a second fluid reservoir.

The orifice 113 can be of any suitable size and shape, and thus, can be selected according to a desired size and shape of the deposition spot 142. In one aspect, the orifice can have a geometric shape, such as a polygon, circle, ellipse, etc. As such, the shapes can include triangular, rectangular, circular, hexagonal, octagonal, etc. In one embodiment, the shape can be a hexagon, for example.

Components of the spotter can be manufactured from any suitable material that is compatible with the substances to be flowed through the spotter, such as silicon, silica, gallium arsenide, glass, ceramics, quartz, neoprene, polytetrafluoroethlene polymers, perfluoroalkoxy polymers, fluorinated ethylene propylene polymers, tetrafluoroethylene copolymers, polyethylene elastomers, polybutadiene/SBR, nitriles, and combinations thereof. In one embodiment, polydimethylsiloxane (PDMS) can be used, and in another embodiment, thermoplastic elastomer can be used. Such materials can allow compression about the orifice to facilitate sealing of the orifice against the deposition surface. In one aspect, the orifice can include an outer rim that protrudes and can be configured to compress and form a seal with the deposition surface.

In one embodiment, the spotter can be configured to "print" by cycling small volume fluid samples over microscopic deposition spot locations on a deposition surface. By printing with flow, biomolecules can be maintained in a liquid environment throughout the printing process, enabling the printing of sensitive biomolecules without exposure to air. It is also possible to print directly from crude material such as hybridoma or supernatants provided there is a capture mechanism on the deposition surface.

Further aspects of spotters 200, 300 for depositing a substance on a submerged surface are illustrated in FIGS. 2A and 2B, respectively. For example, the deposition surface can be submerged in a liquid such that the liquid covers the deposition spot upon removal of the orifice from the deposition surface. In one aspect, shown in FIG. 2A, the deposition surface 240 can be disposed in a reservoir 242 configured to contain the liquid 250. In this case, the deposition surface and the reservoir can be separate components and the deposition surface can be disposed in and removable from the reservoir. In another aspect, shown in FIG. 2B, the deposition surface 340 can form at least a portion of a reservoir 342 for the liquid 350, such as a bottom surface of the reservoir. For example, as discussed further hereinafter, a reservoir can comprise a well of a microtiter plate. The liquid can comprise any suitable liquid for covering a deposition spot. For example, the liquid can be configured to preserve the deposition spot and protect the spot from exposure to the surrounding atmosphere. In one aspect, the liquid can comprise a solution. To facilitate coverage of the deposition spot by the liquid, the deposition surface can be oriented substantially horizontal, however, other orientations are possible, provided the surface that is being spotted is submerged in accordance with examples of the present disclosure.

In use, the spotter can be lowered into a bath of fluid in a reservoir and the orifice can be compressed against the deposition surface to form a seal. The orifice can function as a gasket to form a reversible seal by the application of a force. If any fluid in the reservoir enters the spotter through the orifice, the fluid can be cycled through one of the conduits as printing begins. Printing onto a submerged surface can prevent exposure of the deposition spot to air after printing and the spotter is removed. Alternatively, particularly with microfluidics and very small orifices, when the orifice is passed through the liquid in the reservoir and onto the deposition surface, often the liquid in the reservoir may not enter through the orifice due to surface tensions of the respective fluids. In still other examples, fluid can be added to the reservoir after the orifice has formed a seal with the deposition surface and prior to removal of the spotter from the deposition surface. This can ensure that the deposition spot will be covered by fluid upon removal of the spotter from the deposition surface.

As illustrated in FIG. 2A, the spotter 200 can further comprise a force sensor 270 to facilitate sealing of the orifice against the deposition surface. The force sensor can be coupled to a control system or switch that controls operation and/or movement of the spotter. The force sensor can be used to detect or approximate the amount of force between the orifice and the deposition surface. When the force reaches a predetermined value adequate to ensure sealing between the orifice and the deposition surface, movement of the spotter can cease. Any force that is suitable to retain the seal between the orifice and the deposition surface can be used.

Also illustrated in FIG. 2A is a liquid delivery feature 272, such as a dispensing needle, to supply liquid 250 and facilitate submersion of the deposition surface 240. The liquid delivery feature can be in any suitable location and can be configured to supply liquid to one or more reservoirs. A liquid supply 274 can be fluidly connected to the liquid delivery feature. In one aspect, a liquid sensor 276 can be included and used to cease the supply of liquid at a predetermined level to ensure that an adequate amount of liquid has been delivered to the reservoir. In another aspect, the liquid delivery feature can deliver a predetermined amount of fluid to the reservoir. For example, the liquid delivery feature can be adapted for metered filling of the reservoir before and/or after printing. In a specific aspect, delivery of fluid to the reservoir can be controlled by software, such as part of a control system for controlling operation of the spotter. Automated delivery of fluid to the reservoir can therefore ensure that the deposition spot stays hydrated when the seal is broken between the orifice and the deposition surface as the spotter is removed from the deposition surface, which can enable an automated printing process for biological membranes and associated proteins.

Additionally, a spotter can also be part of a larger system that comprises the spotter and a pump, a vacuum, a fluid supply, and/or a reservoir fluidly coupled to the first and second conduits. These can be used to drive the fluid back and forth through the first and second conduits.

Another example of a spotter 400 for depositing a substance on a submerged surface is illustrated in FIG. 3. The liquid and reservoir have been omitted for clarity, but it is understood that in the context of the present disclosure, the location where the orifice seals against the deposition surface will be submerged in a liquid, e.g., solution, suspension, or the like. The illustrated embodiment shows a multi-cavity arrangement in which the basic format or structure of the spotter discussed above and shown in FIG. 1 is repeated a number of times. For example, the basic spotter structure can be repeated so that there is a plurality of outlet cavities and orifices, and a plurality of first and second conduits fluidly coupled to first and second openings, respectively, of the plurality of outlet cavities. In one aspect, each orifice can be configured to seal individually with the deposition surface. In another aspect, a rim can protrude from a bottom surface of the spotter and can be configured to compress and form a seal with the deposition surface about a plurality of orifices within the boundary of the rim.

In one aspect, FIG. 3 illustrates a row of the outlet cavities. It should be recognized that the row of cavities can be configured as a single row or as multiple rows. Likewise, the spacing between outlet cavities in the same row or in different rows can be varied to produce a desired print head or spotting pattern. The overall size of the spotter can be adjusted to accommodate as many outlet cavities as desired. Multiple cavities can enable an unlimited number of deposition spots to be formed simultaneously with different deposition materials, and the deposition spots can be the same or different sizes and/or shapes. A spotter can therefore be configured to produce microarrays with a virtually unlimited number of defined deposition spots, with each deposition spot individually tailored for certain substances and a specific deposition density. The spotter can also be used to sequentially chemically process individual deposition spots through the use of the same spotter, however, multiple spotters may also be used.

Figure 4:
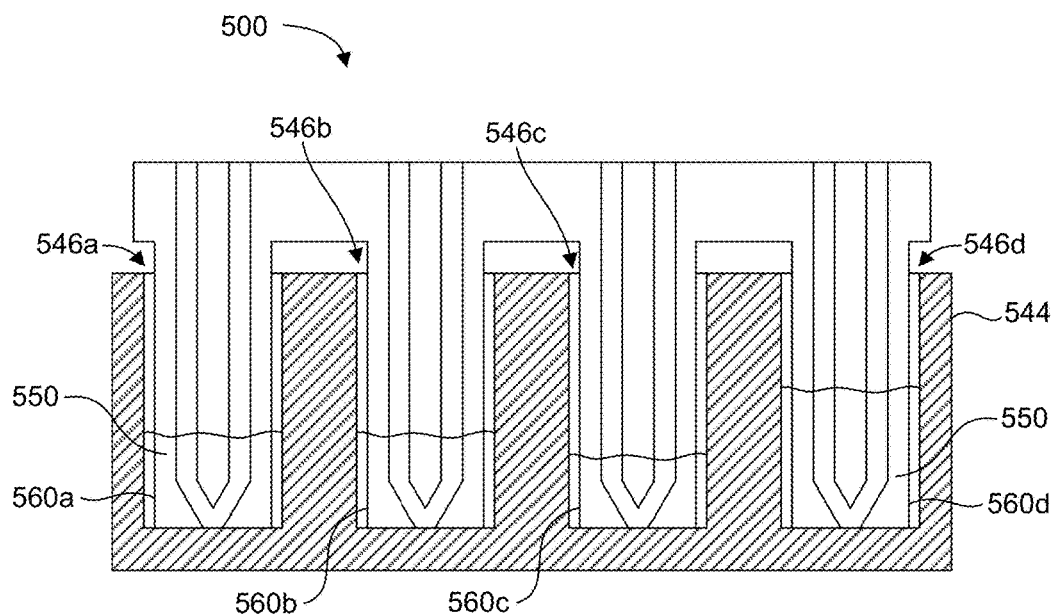
FIG. 4 is an illustration of a spotter in accordance with yet another embodiment of the present disclosure.

Illustrated in FIG. 4 is another embodiment of a spotter 500 for depositing a substance on a submerged surface. In this embodiment, the spotter is configured to accommodate a plurality of deposition surfaces, simultaneously. For example, the spotter can include protrusions 560a-d configured to extend into a plurality of reservoirs 546a-d, respectively. In one aspect, the deposition surfaces can comprise bottom surfaces of wells of a microtiter plate. Each orifice of the spotter can be configured to seal against a different one of the deposition surfaces of the plurality of wells. In one aspect, the number of the plurality of wells can be 8, 16, 32, 96, 192, 384, 768, or 1536 wells, or any other practical number. These are exemplary only, as other numbers of wells and/or outlet cavities can be present. The number of outlet cavities can be different than or equal to the number of wells. An equal number of wells and outlet cavities, however, can enhance efficiency.

Although not illustrated in this figure, similar to other embodiments discussed herein, the spotter 500 can include a plurality of liquid delivery features to supply liquid 550 and facilitate submersion of the plurality of deposition surfaces of the plurality of wells. In one aspect, one liquid delivery feature can be associated with each protrusion 560a-d to provide liquid for each well 546a-d. It should be recognized that the liquid levels and types of liquid in the wells can be the same or different from one another, so long as the liquid in the wells covers the deposition spots upon removal of the spotter. The features of the spotter shown and described herein can therefore enable fully automated immobilization of microarray deposition spots in a densely packed array.

A method for depositing a substance on a submerged surface is also disclosed herein. The method can comprise obtaining a spotter including an outlet cavity defined at least in part by an orifice and having a first opening and a second opening, a first conduit fluidly coupled to the first opening, and a second conduit fluidly coupled to the second opening. The method can also comprise submerging a deposition surface in a liquid. The method can further comprise sealing the orifice against the deposition surface. Additionally, the method can comprise causing fluid to flow through the first conduit and the second conduit, thereby communicating among the first opening, the second opening, and the deposition surface to form a deposition spot on the deposition surface. It is noted that no specific order is required in this method, though generally in one embodiment, these method steps can be carried out sequentially.

In one aspect, the method can further comprise removing the orifice from the deposition surface, such that the liquid covers the deposition spot. In another aspect, the method can further comprise disposing the liquid in a reservoir. In a specific aspect, the reservoir can form at least a portion of a microtiter plate.

EXAMPLES

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the invention be limited, except as by the claims set forth below.

Example 1—Sealing a Print Head Against a Wetted Slide Surface

Figure 5:
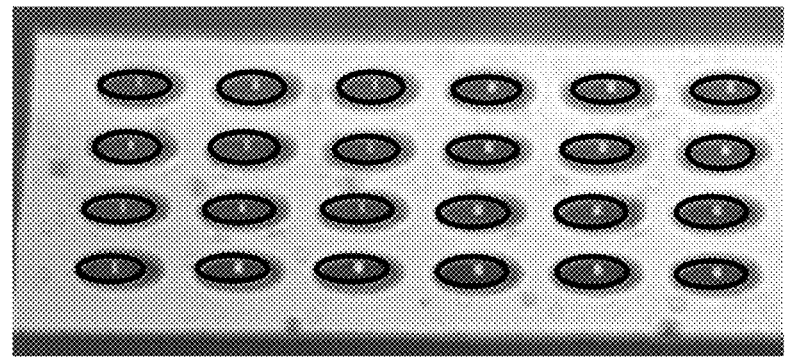
FIG. 5 illustrates a spotter in accordance with an embodiment of the present disclosure sealed against a deposition surface.

A print head was sealed against a slide surface submerged in water. In viewing the sealing process using the optics of an SPR imaging instrument (FIG. 5), the wetted SPR slide surface appears dark gray. Upon sealing the CFM print head onto the submerged slide, the white outline of the CFM print head face clearly became visible due to the difference in refractive index between PDMS and water. The area inside of the thick black ovals approximates data acquisition "regions of interest" for the SPR instrument software. This process has been repeated many times, and it has been shown that the orifices of the print head face reproducibly displace the fluid and form a clean seal with the slide surface.

Example 2—GPCR Printing

Figure 6:
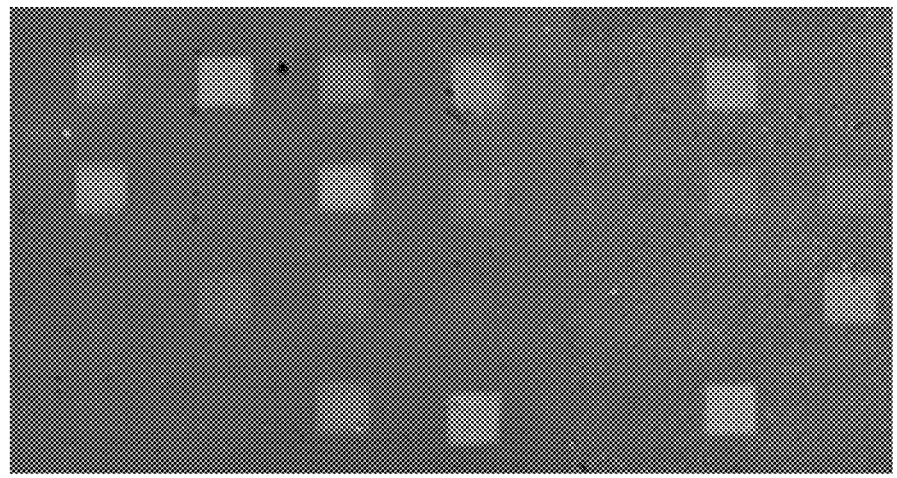
FIG. 6 is a surface plasmon resonance (SPR) image of captured g-protein coupled receptor (GPCR) spots created using a spotter in accordance with an embodiment of the present disclosure.

Using a 48 channel print head, a tagged GPCR was captured out of a crude cell preparation solubilized with 48 different detergents (see FIG. 6). After spotting, the slide was immediately removed, a buffer was pipetted onto the surface, and a cover slip was applied. The different spot intensities shown in FIG. 6 reflect the concentration of receptor solubilized with the different detergents. The spotted sensor chip was placed in an array-based SPR biosensor and was measured for the binding profiles for a conformationally sensitive ligand. In 2 hours, each of the detergents which contained long chain maltosides maintained the binding activity of CCR5. The challenge in spotting GPCRs is that, normally, these receptors are present at low concentrations with high amounts of contaminating proteins. This same study using a standard biosensor would have taken over 72 hours.

Example 3—Lipid Printing

Figure 7A:
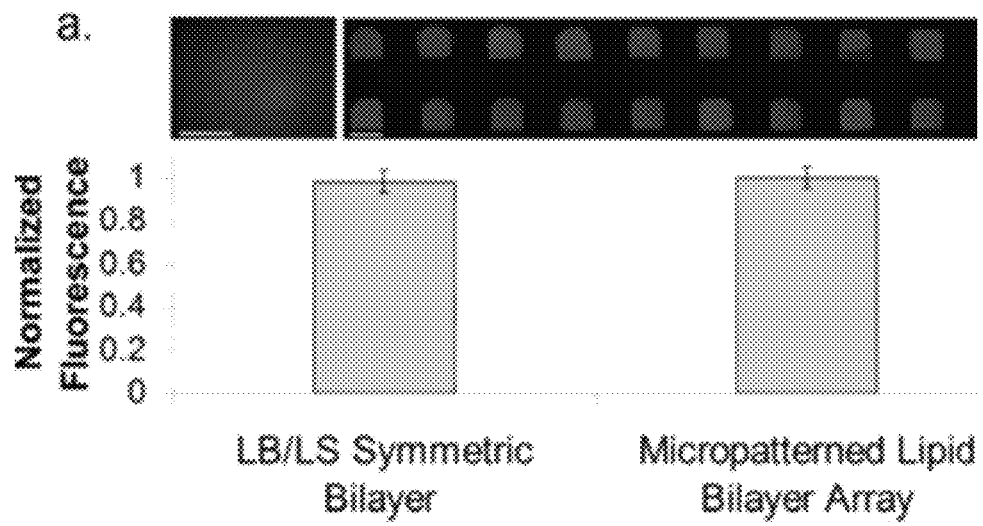
FIGS. 7A and 7B are characterizations of lipid bilayer arrays created using a spotter in accordance with an embodiment of the present disclosure.
Figure 7B:
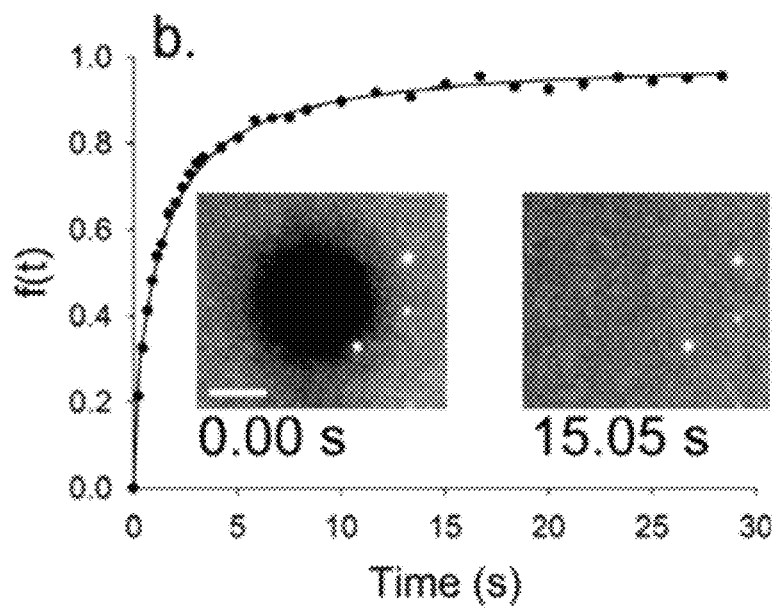

Using a manual prototype, it was demonstrated that the use of a print head in accordance with the present disclosure for creating high-density planar supported lipid bilayer (PSLB) arrays by vesicle fusion was possible. After flow printing, the fluid was pipetted around the print head tip before breaking the seal, and additional fluid was added as the print head was removed. FIGS. 7A and 7B show the characterization of the printed lipid array spots. As show in FIG. 7A, the fluorescence observed from the Langmuir-Blodgett/Langmuir-Schaefer (LB/LS) bilayer and the spots are not significantly different at the 95% confidence level, supporting the formation of only a single bilayer structure utilizing the deposition methods as disclosed herein. FIG. 7B shows fluorescence recovery after photobleaching (FRAP) experiments which were performed to validate the fluidity of the lipid spots. The measured diffusion coefficient was in good agreement with previously reported values for PSLBs and within the same order of magnitude of solution phase liposomes.

While the present disclosure has been described above with particularity and detail in connection with what is presently deemed to be the most practical embodiments of the disclosure, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for depositing a substance on a submerged deposition surface, comprising:
    obtaining a spotter, including:
        an outlet cavity defined at least in part by a spotting orifice, a first opening, and a second opening,
        a first conduit fluidly coupled to the first opening, and
        a second conduit fluidly coupled to the second opening;
    sealing the spotting orifice against a deposition surface;
    causing a fluid comprising a deposition material to flow through the first conduit into the outlet cavity and out through the second conduit, thereby communicating among the first opening, the second opening, and the deposition surface to form a deposition spot comprising the deposition material on the deposition surface via the spotting orifice sealed against the deposition surface; and
    removing the spotting orifice from the deposition surface, wherein the deposition surface is submerged and the spotter is at least partially submerged in a liquid prior to removing the spotting orifice from the deposition surface such that the liquid covers the deposition spot when the spotting orifice is removed from the deposition surface, wherein the liquid is not the fluid comprising the deposition material.

2. The method of claim 1, wherein the deposition surface is submerged in the liquid in a liquid reservoir.

3. The method of claim 2, wherein the liquid reservoir forms at least a portion of a microtiter plate.

4. The method of claim 1, wherein the deposition surface forms at least a portion of a liquid reservoir.

5. The method of claim 2, further comprising delivering the liquid to the liquid reservoir.

6. The method of claim 5, wherein the liquid is delivered to the liquid reservoir prior to sealing the spotting orifice against the deposition surface.

7. The method of claim 5, wherein the liquid is delivered to the liquid reservoir after sealing the spotting orifice against the deposition surface and prior to removing the spotting orifice from the deposition surface.

8. The method of claim 5, wherein the liquid is delivered in a predetermined amount.

9. The method of claim 2, wherein the outlet cavity comprises a plurality of outlet cavities with a plurality of spotting orifices, and the first conduit and the second conduit comprise a plurality of first and second conduits fluidly coupled to first and second openings, respectively, of the plurality of outlet cavities.

10. The method of claim 9, wherein the deposition surface comprises a plurality of deposition surfaces, and the liquid reservoir comprises a plurality of wells of a microtiter plate.

11. The method of claim 10, wherein each orifice of the plurality of spotting orifices is configured to seal against a different one of the plurality of deposition surfaces of the plurality of wells.

12. The method of claim 1, wherein the liquid comprises a solution.

13. The method of claim 1, further comprising orienting the deposition surface in a horizontal orientation.

14. The method of claim 1, further comprising sensing a force of the spotting orifice against the deposition surface to facilitate sealing the spotting orifice against the deposition surface.

15. The method of claim 1, further comprising controlling, with a control system, sealing of the spotting orifice against the deposition surface and causing fluid to flow through the first conduit and the second conduit.

16. The method of claim 1, further comprising driving the fluid back and forth through the first and second conduits.

17. The method of claim 1, wherein the liquid is present on the deposition surface before the spotting orifice is sealed against the deposition surface.

* * * * *